July 7, 1964

J. L. LEE ETAL 3,140,109

NOTCHED DISC CORD HOLDER

Filed March 23, 1962

INVENTORS
JOHN L. LEE +
HARRY C. EBERLY

BY *Joseph A. Brown*

ATTORNEY

United States Patent Office 3,140,109
Patented July 7, 1964

---

3,140,109
NOTCHED DISC CORD HOLDER
John L. Lee, Reamstown, and Harry C. Eberly, Narvon, Pa., assignors to Sperry Rand Corporation, New Holland, Pa., a corporation of Delaware
Filed Mar. 23, 1962, Ser. No. 182,039
2 Claims. (Cl. 289—14)

This invention relates generally to tying mechanisms and more particularly to twine knotters as used on automatic hay balers. Still more specifically, the invention relates to an improved disc assembly for a twine knotter.

A conventional hay baler knotter has a rotatable twine disc assembly with which a finger is cooperative for holding twine strands while bales are being formed and during tying operations. A free end strand is clamped in the assembly during bale formation and upon completion of the tie, the free end strand is released and a new strand is cut and clamped to provide the next free end. The twine discs in the assembly each have four peripheral notches angularly spaced 90° relative to each other. Conventionally, each notch is of semi-circular, arcuate configuration, having a curved inner wall the depth of which is commonly as great as the width of the notch. When a new strand of twine is deposited in a notch through which a previously laid free end strand extends, it commonly happens that the new strand at least partially rests on top of the free end strand. The curved walls of the notch "cam" the strands toward each other. When engaged by the twine holding finger of the assembly, the hold on the strands is sometimes unequal, depending upon the relative locations of the strands. As a result, slippage of one strand, or the other strand, or both strands may result and a tie may be missed.

In addition to the problem resulting from the shape of the notches in the twine discs of the knotter assembly, supporting the discs for rotatable indexing also involves problems. When a two disc structure is used, the space available for the assembly is generally fully adequate. However, when a three disc structure is used, as is common on large heavy duty balers involving high twine tensions during baling operations, space problems result. It is desirable to have the three disc assembly occupy as small a space as possible. Likewise, keeping the number of parts employed to a minimum is advantageous, both from a manufacturing and repair standpoint.

A main object of this invention is to provide, in a hay baler knotter mechanism, a twine disc assembly of improved construction having better operating characteristics than similar disc assemblies of prior design.

Another object of this invention is to provide a disc assembly in which two twine strands deposited in a given disc notch are disposed side by side, means being provided so that when the strands are clamped, they are clamped against a flat surface.

Another object of this invention is to provide a disc assembly of the character described having notches of novel configuration to provide better clamping and twine control.

A further object of this invention is to provide a disc assembly of the character described and having three discs, the overall structure having fewer parts and occupying less space than three disc assemblies of prior design.

A still further object of this invention is to provide a three disc assembly which can be manufactured, assembled and repaired at low cost.

Other objects of this invention will be apparent hereinafter from the specification and from the recital in the appended claims.

Figure 1:
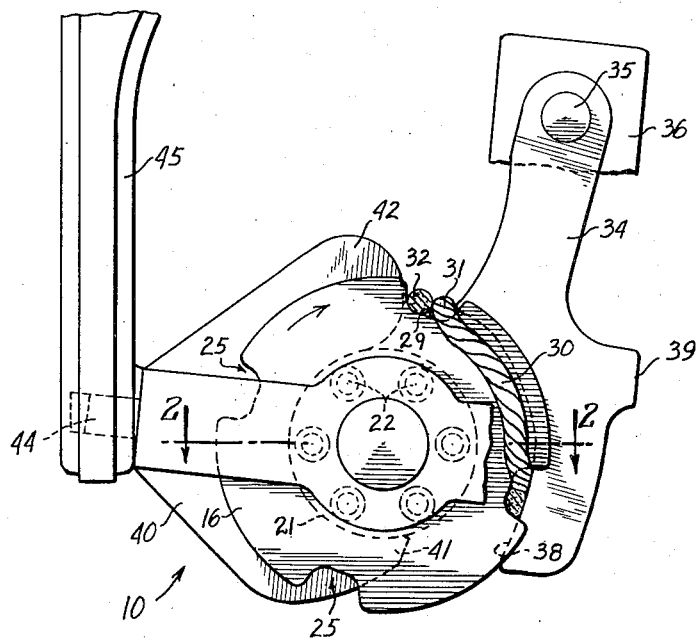
FIG. 1 is a plan view of a twine disc assembly constructed according to this invention.

Referring now to the drawing by numerals of reference, 10 (FIG. 1) denotes generally a twine disc assembly of the three disc type and comprising a stud shaft 11 conventionally rotatably mounted by means not shown. Shaft 11 is cylindrical and elongated, having a flange 12 at one end thereof which extends in a plane transverse to the shaft axis and projects radially outwardly of the shaft. Fixedly mounted on shaft 11 are three twine discs, namely a first disc 14, a second disc 15 and a third disc 16. These discs are in the form of flat plates which extend parallel to each other and parallel to the flange 12 on shaft 11. The disc 14 has a central bore 18 whereby the disc may be passed over the body of shaft 11 and abut against the face 19 of flange 12. The disc 15 engages the opposite face 20 of flange 12. Interposed between the second disc 15 and the third disc 16 is a spacer 21 having a diameter substantially the same as the flange 12. The discs 14, 15 and 16 are fixedly connected to each other and to the flange 12 and spacer 21 by rivets 22 angularly spaced about the axis of the shaft 11.

Figure 2:
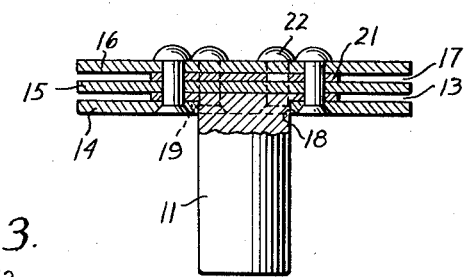
FIG. 2 is a section taken on line 2—2 of FIG. 1 looking in the direction of the arrows and showing the mounting structure for the twine discs.
Figure 3:
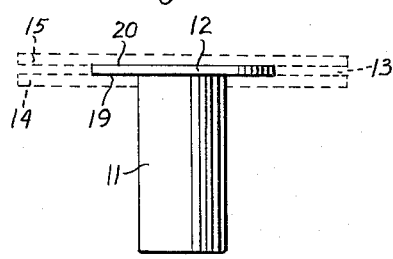
FIG. 3 is a side elevation showing the mounting stud for the twine discs and indicating in dotted lines the positions of two of the discs relative to the end flange of the stud.

As shown in FIG. 2, the thickness of the flange 12 is substantially the same as the thickness of the spacer 21. Thus, the space 13 between discs 14 and 15 is substantially the same as the space 17 between the discs 15 and 16. Further, the flange 12 serves a dual purpose. In addition to providing the space 13 between the first and the second discs of the assembly, it also provides the means for connecting the three discs to the shaft 11. Arranging the parts and connecting them together in this manner, reduces the total number of parts required in the assembly and minimizes the space required.

Figure 4:
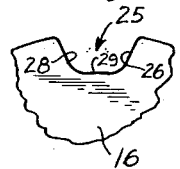
FIG. 4 is a fragmentary view of one notch portion of a disc and illustrating the configuration of the notch.

Each disc of assembly 10 has four, peripheral, wide mouth notches 25, angularly spaced 90° relative to each other. When riveted together, the notches in the three discs are in register with each other. Each notch has a configuration as best shown in FIG. 4, having radially extending, angularly spaced side walls 26 and 28, and a transversely extending flat bottom inner wall 29. As shown, the transverse extension of inner wall 29 is greater than the depth of side walls 26 and 28. The space between the side walls is such that two strands of baler twine, even large diameter heavy duty twine, may be deposited in the notch and extend side by side rather than one strand on top of each other.

In FIG. 1, 30 denotes a free end strand having a portion 31 which extends through a twelve o'clock set of notches in the disc assembly and alongside of which a second strand 32 is adapted to be deposited. The strand portions 31 and 32 both engage the flat bottom inner wall 20 of the notch. For clamping the portions of the strands in the three o'clock set of notches, a conventional twine holding finger structure 34 is provided and pivotally mounted at 35 on support 36. Structure 34 comprises two finger elements, not shown, which extend side by side and of such width that they may project respectively into the spaces 13 and 17 between the twine discs. Each twine finger has an inwardly facing arcuate section 38 which engages the strand portions and clamps them flat in the adjacent disc notches. A seat 39 is provided on finger structure 34 against which a spring, not shown, may abut to bias the twine fingers in a clockwise direction, when viewed as shown in FIG. 1, and toward the disc assembly.

Also projecting between two of the discs of assembly 10, is a flat twine stripping member 40 which is generally U-shaped in plan, having a stripping portion 41 and a twine guide portion 42. The stripping member 40 is mounted at 44 on a support bracket 45. When the discs are rotated, twine in the three o'clock notches 25 will engage the end 41 of member 40 and be stripped from the assembly. When a new strand is delivered by a needle of the knotter mechanism, specifically strand 32, the curved portion 12 services to guide the strand into the twelve o'clock notches.

With the structure described, the notches 25 are of sufficient width to accommodate two heavy duty twine strands in side by side relationship. Since the diameters of various types of twine will vary somewhat, the space provided is adequate to receive the greatest diameter twine conventionally available. The bottom inner wall 29 of each notch provides a flat surface against which the twine can be clamped securely by the twine finger structure 34. The arrangement of the discs on the twine disc assembly shaft 11 provides a compact structure having few parts thereby minimizing manufacturing, assembly and repair problems.

The problem of twine slippage once the twine has been clamped by the finger structure 34 is overcome. As a result, better operating characteristics are obtained with the twine knotter mechanism. Since the twine extends side by side in the disc notches, they are both subjected to an equal clamping action by the finger structure 34.

While this invention has been described in connection with a particular embodiment thereof, it will be understood that it is capable of modification, and this application is intended to cover any variations, uses or adaptations following, in general, the principles of the invention and including such departures from the present disclosures as come within known or customary practice in the art to which the invention pertains, and as fall within the scope of the invention or the limits of the appended claims.

Having thus described our invention, what we claim is:

1. In a mechanism for tying knots in baler twine and the like, a rotatable twine disc assembly comprising, in combination, a stud shaft having a fixed flange at one end thereof and extending radially of the shaft in a plane perpendicular to the shaft axis, a centrally bored first disc mounted on said shaft and abutting against the side of said flange adjacent the shaft, a second disc abutting against the opposite side of said flange remote from the shaft, a third disc extending alongside said second disc, all of said discs being of the same thickness, a spacer interposed between said second and third discs, said discs and spacer extending in planes parallel to said flange, rivet means fixedly clamping and securing said discs to each other and to said flange and said spacer, the thickness of said flange being substantially the same as the thickness of said spacer whereby the space between said first disc and said second disc is substantially equal to the space between said second disc and said third disc, each of said discs having angularly spaced, radially inwardly extending, peripheral notches, the notches in one disc being in angular register with the notches in the other discs, each notch having angularly spaced radially extending side walls and a transversely extending flat bottom inner wall connecting the side walls, the transverse extension of the flat bottom inner wall being such that two strands of said twine may extend side by side through the notch and abut against the inner wall filling substantially all of the space between the side walls, and the distance of radial projection of the side walls being materially less than the distance of transverse extension of the flat bottom inner wall.

2. In a mechanism for tying knots in baler twine and the like, a rotatable twine disc assembly comprising, in combination, a stud shaft having a fixed flange at one axial end thereof extending in a plane perpendicular to the shaft axis and projecting radially outwardly of the shaft, a first disc mounted on said shaft and abutting against the side of said flange adjacent the shaft, a second disc abutting against the opposite side of said flange remote from the shaft, a third disc extending alongside said second disc, all of said discs being of the same thickness, a spacer interposed between said second and third discs, said disc and said spacer extending in planes parallel to said flange, and means fastening said discs to each other and to said flange and said spacer, the thickness of said flange being substantially the same as the thickness of said spacer whereby the space between said first disc and said second disc is substantially equal to the space between said second disc and said third disc.

References Cited in the file of this patent

UNITED STATES PATENTS

| | | |
|---|---|---|
| 427,844 | Gabel | May 13, 1890 |
| 2,703,246 | Bornzin | Mar. 1, 1955 |
| 2,815,233 | Collins | Dec. 3, 1957 |
| 2,815,234 | Collins | Dec. 3, 1957 |